United States Patent
Koseki et al.

[11] Patent Number: 5,919,550
[45] Date of Patent: Jul. 6, 1999

[54] BIAXIALLY ORIENTED LAMINATE POLYESTER FILM

[75] Inventors: Masafumi Koseki; Toshifumi Osawa; Ieyasu Kobayashi, all of Sagamihara, Japan

[73] Assignee: Teijin Limited, Osaka, Japan

[21] Appl. No.: 08/788,012

[22] Filed: Jan. 24, 1997

[30] Foreign Application Priority Data

Jan. 26, 1996 [JP] Japan ..................... 8-011669

[51] Int. Cl.$^6$ ................. B32B 27/06; B32B 27/20; B32B 27/36
[52] U.S. Cl. ................. 428/141; 428/212; 428/327; 428/330; 428/331; 428/402; 428/480; 428/694 TR; 428/694 BR; 428/694 ST; 428/694 SL; 428/694 SG; 428/910
[58] Field of Search .................... 428/141, 212, 428/323, 327, 328, 329, 330, 331, 480, 694 ST, 694 SL, 694 SG, 910, 402, 694 TR, 694 BR

[56] References Cited

U.S. PATENT DOCUMENTS

| | | | |
|---|---|---|---|
| 4,818,581 | 4/1989 | Katoh et al. | 428/143 |
| 5,164,439 | 11/1992 | Sakamoto et al. | 524/425 |
| 5,270,096 | 12/1993 | Kato et al. | 428/143 |
| 5,429,855 | 7/1995 | Kotani et al. | 428/141 |
| 5,532,047 | 7/1996 | Okazaki et al. | 428/213 |
| 5,670,236 | 9/1997 | Kotani et al. | 428/141 |

FOREIGN PATENT DOCUMENTS

| | | |
|---|---|---|
| 3-90329 | 4/1991 | Japan . |
| 4-119845 | 4/1992 | Japan . |

*Primary Examiner*—Vivian Chen
*Attorney, Agent, or Firm*—Sughrue, Mion, Zinn, Macpeak & Seas, PLLC

[57] ABSTRACT

A biaxially oriented laminate polyester film consisting of a polyester layer A containing lubricant particles I and II and a polyester layer B laminated on one side of the polyester A, wherein each of the lubricant particles I and II contains non-agglomerated particles in a proportion of 80 to 100%; the lubricant particles I are selected from the group consisting of silica, calcium carbonate and crosslinked polymer particles and have an average particle diameter of 0.3 to 1.0 $\mu$m and are contained in an amount of 0.005% by weight or more but less than 0.1% by weight; the lubricant particles II are selected from the group consisting of silica and crosslinked polymer particles and have an average particle diameter which satisfies the following expression (1):

$$1 < d_I/d_{II} \leq 10 \tag{1}$$

wherein $d_I$ is an average particle diameter of the lubricant particles I and $d_{II}$ is an average particle diameter of the lubricant particles II, and are contained in an amount of 0.1% by weight or more but less than 1.0% by weight. This biaxially oriented laminate polyester film has excellent flatness, scraping resistance and take-up property and is useful as a base film for a magnetic recording medium.

18 Claims, 1 Drawing Sheet

BIAXIALLY ORIENTED LAMINATE POLYESTER FILM

BACKGROUND OF THE INVENTION

1. Field of the Invention

This invention relates to a biaxially oriented laminate polyester film. More specifically, it relates to a biaxially oriented laminate polyester film which has excellent flatness, scraping resistance and take-up property and which is useful as a base film for a magnetic recording medium.

2. Description of the Related Art

A biaxially oriented polyester film typified by a polyethylene terephthalate film is used for a wide variety of applications, especially as a base film for a magnetic recording medium, because of its excellent physical and chemical properties.

In recent years, with attempts made to increase the density and capacity of a magnetic recording medium, an improvement in the surface flatness and a reduction in the thickness of a base film have been strongly desired However, when the surface of a base film is made flat to retain excellent electromagnetic conversion characteristics, slipperiness becomes insufficient. For instance, when it is rolled, wrinkles are produced or blocking occurs, resulting in an uneven surface of a film roll which deteriorates production yield, narrows the suitable ranges of tension, contact pressure and speed at the time of winding up and makes it extremely difficult to wind up the film. When slipperiness is low in a film processing step, friction between a film and a metal roll increases and scraped powders are produced, resulting in omission of a magnetic recording signal, that is, a dropout.

Generally speaking, to improve the slipperiness of a polyester film, there are employed a method for providing an uneven surface to a film (1) by precipitating inert particles from a residual catalyst into a starting material polymer in the production process; (ii) by adding inert particles; or the like. As the size and amount of particles contained in the film increase, the film has more improved slipperiness.

On the other hand, as described above, the surface of a base film is desired to be as flat as possible from the view of improvement of the electromagnetic conversion characteristics thereof. When a film of which the base film surface is rough is formed into a magnetic recording medium, the uneven surface of the base film makes the surface of a magnetic layer formed on the base film uneven, thereby deteriorating the electromagnetic conversion characteristics. In this case, as the size and amount of the particles contained in the base film increase, the surface of the base film becomes rougher and the electromagnetic conversion characteristics thereof becomes worse.

As means for improving both slipperiness and electromagnetic conversion characteristics, which are inconsistent with each other, there is a widely known means for forming a laminate film having a flat surface coated with a magnetic layer to improve the electromagnetic conversion characteristics and an opposite surface having a roughened surface to improve the slipperiness.

However, even when the above biaxially oriented laminate polyester film is used and a surface opposite to its magnetic layer-coated surface is roughened (to be referred to as "rough surface" hereinafter), it still has the problems of slipperiness and scraping resistance and a further problem that, since the thickness of the base film is small, the magnetic layer-coated surface is affected depending on the amount, kind and particle diameter of a lubricant added to the rough surface so that the flat surface has protuberance, thereby causing deterioration in the flatness.

As means for improving abrasion resistance and travelling property, there is proposed a means for containing particles A and an agglomerate of particles B in a base film to improve abrasion resistance and travelling property.

Japanese Laid-open Patent Application No. Hei 3-90329 proposes a method for adding silica particles and linearly agglomerated silica particles. However, when the linearly agglomerated silica particles, i.e., agglomerates of particles are used in combination with the silica particles, the affinity of the particles with a base film is impaired because the particles are agglomerated and they fall off easily by their contact with a device. Furthermore, the particles tend to agglomerate into a big mass to form protrusions which deteriorate the electromagnetic conversion characteristics.

As means for improving abrasion resistance, there is proposed a means for containing single-component particles in a base film. Japanese Laid-open Patent Application No. Hei 4-119845 proposes a method for containing spherical silica particles. However, when particles of small particle size are contained, a gap produced by unevenness on the surface is small and hence, an air squeeze property deteriorates at the time of winding up a film in the production process to cause a defect on the roll. When the particle size is too large, the surface becomes too rough and in consequence, is liable to be scraped, or a flat surface to be coated with a magnetic layer is affected such that the flat surface has protuberance, thereby causing deterioration in the electromagnetic conversion characteristics.

SUMMARY OF THE INVENTION

It is therefore an object of the present invention to provide a novel biaxially oriented laminate polyester film.

It is another object of the present invention to provide a biaxially oriented laminate polyester film which has excellent surface flatness and scraping resistance as well as excellent take-up property in the production process thereof.

Figure 1:
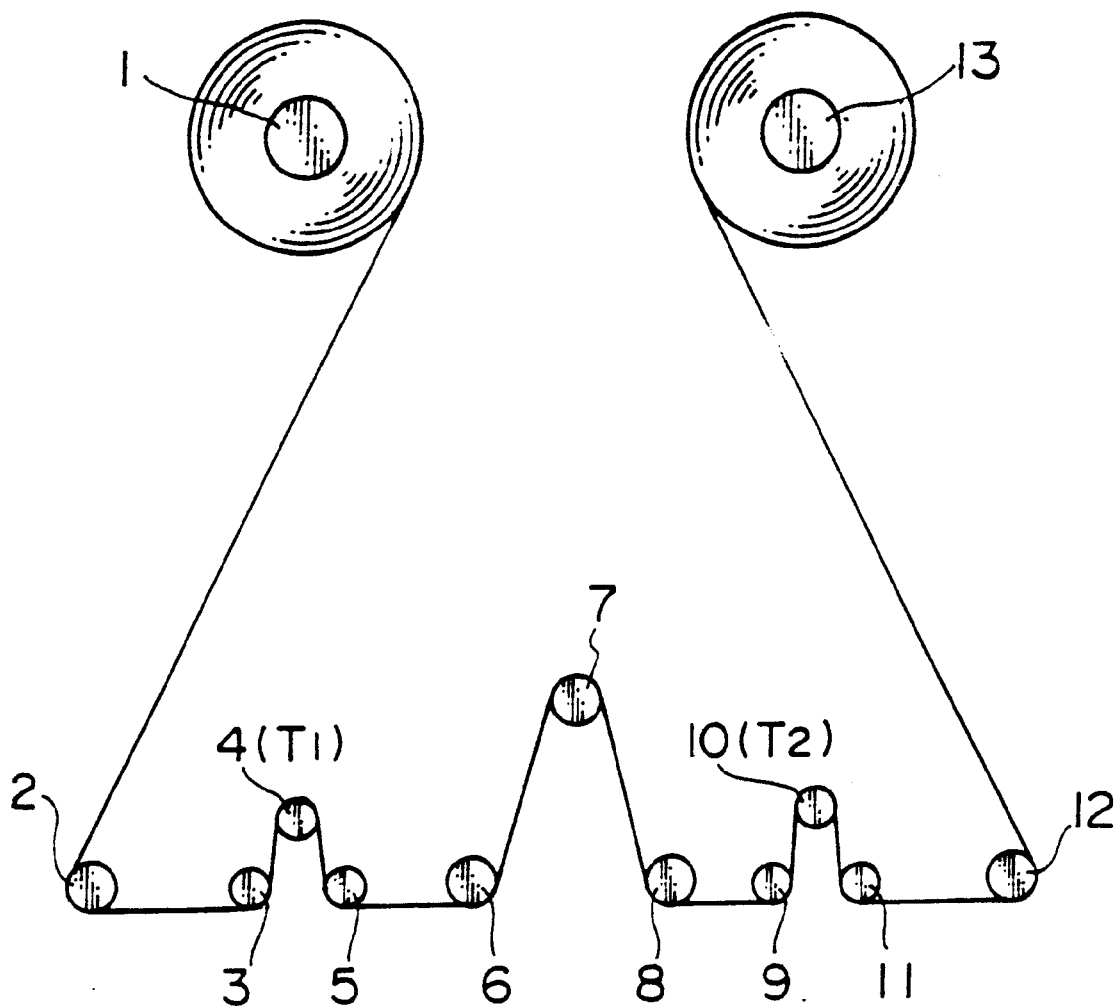
FIG. 1 shows an apparatus for measuring the traveling film friction coefficient.

The above and other objects and advantages of the present invention will become apparent from the following description.

According to the present invention, firstly, the above objects and advantages of the present invention are attained by a biaxially oriented laminate polyester film which consists of a polyester layer A containing lubricant particles I and II and a polyester layer B laminated on one side of the polyester layer A, wherein the lubricant particles I and II contain non-agglomerated particles in a proportion of 80 to 100%, the lubricant particles I have an average particle diameter of 0.3 to 1.0 µm and are contained in an amount of 0.005% by weight or more but less than 0.1% by weight, and the lubricant particles II have an average particle diameter which satisfies the following expression (1):

$$1 < d_I / d_{II} \leq 10 \qquad (1)$$

wherein $d_I$ is an average particle diameter of the lubricant particles I and $d_{II}$ is an average particle diameter of the lubricant particles II, and are contained in an amount of 0.1% by weight or more but less than 1.0% by weight.

DESCRIPTION OF THE PREFERRED EMBODIMENTS

In the present invention, the polyester is a polyester comprising an aromatic dicarboxylic acid as a main acid component and an aliphatic glycol as a main glycol component. That is, the polyester is preferably a polyester comprising an aromatic dicarboxylic acid in a proportion of at least 50 mol % of the total of acid components and an aliphatic glycol in a proportion of at least 50 mol % of the total of glycol components. Preferably, the polyester is substantially linear and has a film-forming property, particularly a film-forming property by melt molding. Illustrative examples of the aromatic dicarboxylic acid include terephthalic acid, naphthalenedicarboxylic acid, isophthalic acid, diphenoxyethanedicarboxylic acid, diphenyldicarboxylic acid, diphenyletherdicarboxylic acid, diphenylsulfonedicarboxylic acid, diphenylketonedicarboxylic acid, anthracenedicarboxylic acid and the like. Illustrative examples of the aliphatic glycol include polymethylene glycol having 2 to 10 carbon atoms such as ethylene glycol, trimethylene glycol, tetramethylene glycol, pentamethylene glycol, hexamethylene glycol and decamethylene glycol; alicyclic diols such as cyclohexane dimethanol; and the like.

In the present invention, the polyester preferably contains alkylene terephthalate and/or alkylene naphthalenedicarboxylate as a main constituent(s). Of such polyesters, particularly preferred are not only polyethylene terephthalate and polyethylene-2,6-naphthalenedicarboxylate but also a copolymer which comprises terephthalic acid and/or 2,6-naphthalenedicarboxylic acid in a proportion of 80 mol % or more of the total of dicarboxylic acid components and ethylene glycol in a proportion of 80 mol % or more of the total of glycol components. In the case of the copolymer, 20 mol % or less of the total of acid components can be any of the above-described aromatic dicarboxylic acids other than terephthalic acid and/or 2,6-naphthalenedicarboxylic acid; an aliphatic dicarboxylic acid such as adipic acid or sebacic acid; an alicyclic dicarboxylic acid such as cyclohexane-1,4-dicarboxylic acid; or the like. 20 mol % or less of the total of glycol components can be any of the above-described glycols other than ethylene glycol; an aromatic diol such as hydroquinone, resorcin or 2,2-bis(4-hydroxyphenyl) propane; an aliphatic diol having an aromatic ring such as 1,4-dihydroxydimethylbenzene; a polyalkylene glycol (polyoxyalkylene glycol) such as polyethylene glycol, polypropylene glycol or polytetramethylene glycol; or the like.

Further, the polyester in the present invention includes also those prepared by copolymerizing or binding a component derived from oxycarboxylic acid such as an aromatic hydroxy acid exemplified by hydroxybenzoic acid or aliphatic hydroxy acid exemplified ω-hydroxycaproic acid in a proportion of 20 mol % or less of the total amount of dicarboxylic acid components and oxycarboxylic acid components.

The polyester in the present invention includes also those prepared by copolymerizing polycarboxylic acid or a polyhydroxy compound having three or more functional groups such as trimellitic acid or pentaerythritol, in an amount that it is substantially linear, for example, 2 mol % or less of the total of all the acid components.

The above polyesters are known per se and can be produced by any of known methods per se.

The polyester preferably has an intrinsic viscosity measured at 35° C. in an o-chlorophenol solution of 0.4 to 0.9, more preferably 0.5 to 0.7, particularly preferably 0.55 to 0.65.

The biaxially oriented laminate polyester film of the present invention consists of two layers: polyester layer A and polyester layer B. The polyesters of these layers, which may be the same or different, preferably are the same.

The polyester layer A contains lubricant particles I and II. The proportion of non-agglomerated particles in the lubricant particles I and II should be 80 to 100% If the proportion of the non-agglomerated particles is smaller than 80%, the lubricant particles are liable to fall off, the scraping resistance of the resulting film greatly deteriorates, coarse protrusions produced by the agglomeration of particles make rough a surface having a magnetic layer, thereby causing a reduction in the electromagnetic conversion characteristics disadvantageously.

The proportion of non-agglomerated particles is preferably 85 to 97%, more preferably 90 to 97% It is difficult to prepare lubricant particles containing non-agglomerated particles in a proportion of more than 97%.

The proportion of the non-agglomerated particles is a value obtained from the following equation (3) when the number of agglomerates of two or more primary particles per 1 mm$^2$ of a film surface is represented by X and the total number of independent primary particles which do not form an agglomerate and agglomerates of particles is represented by Y.

Proportion of non-agglomerated particles (%)

$$= X/Y \times 100 \tag{3}$$

X and Y are described in more detail. For example, when there are a number ($a_1$) of agglomerates of two particles, a number ($a_2$) of agglomerates of three particles, and a number ($a_3$) of independent non-agglomerated primary particles, $X = a_1 + a_2$ and $Y = a_1 + a_2 + a_3$.

In the above biaxially oriented laminate polyester film, the average particle diameter of the lubricant particles I contained in the polyester layer A is 0.3 to 1.0 μm, preferably 0.4 to 0.8 μm. If the average particle diameter is more than 1.0 μm, the surface will become rough and the scraping resistance will deteriorate. If the average particle diameter is less than 0.3 μm, the travelling property and the air squeeze property between films will greatly deteriorate disadvantageously.

The content of the lubricant particles I should be 0.005% by weight or more but less than 0.1% by weight. If the content is above 0.1% by weight, the scraping resistance of the resulting film will deteriorate, and if it is below 0.005% by weight, the travelling property of the resulting film will lower disadvantageously. The content of the lubricant particles I is preferably 0.008 to 0.8% by weight.

In the above biaxially oriented laminate polyester film, the average particle diameter of the lubricant particles II contained in the polyester layer A should satisfy the following expression (1) in connection with the average particle diameter of the lubricant particles I.

$$1 < d_I/d_{II} \leq 10 \tag{1}$$

wherein $d_I$ is an average particle diameter of the lubricant particles I and $d_{II}$ is an average particle diameter of the lubricant particles II.

The average particle diameter of the lubricant particles II preferably satisfies the following expression (2).

$$2 \leq d_I/d_{II} \leq 8 \tag{2}$$

wherein $d_I$ and $d_{II}$ are defined the same as in the above expression (1).

The $d_I/d_{II}$ ratio is more preferably in the range of 3 to 7.

If the $d_I/d_{II}$ ratio is more than 10, the travelling property of the resulting film will deteriorate and blocking between films will be large, thereby deteriorating the take-up property of the film. On the other hand, if the ratio is below 1, the surface of the film will become rough, the scraping resistance of the film and the electromagnetic conversion characteristics of a magnetic recording medium comprising the film as a base film will deteriorate disadvantageously.

The content of the lubricant particles II should be 0.1% by weight or more but less than 1.0% by weight. If the content is less than 0.1% by weight, the travelling property of the resulting film will deteriorate and blocking between films will be large, thereby deteriorating the take-up property of the film. On the other hand, if the content is 1.0% or more by weight, the surface of the film will become very rough, the scraping resistance of the film and the electromagnetic conversion characteristics of a magnetic recording medium comprising this film as a base film will deteriorate disadvantageously.

The content of the lubricant particles II is preferably 0.2 to 0.5% by weight, particularly preferably 0.2 to 0.4% by weight.

The lubricant particles I and the lubricant particles II may be either inorganic particles or crosslinked polymer particles. As the inorganic particles and the crosslinked polymer particles may be used known lubricant particles.

Illustrative examples of the inorganic particles include silica, alumina, silica alumina, clay, titanium dioxide and the like, of which silica is particularly preferred.

Illustrative examples of the polymer particles include crosslinked polystyrene resin particles, crosslinked silicone resin particles, crosslinked acrylic resin particles, crosslinked styrene-acrylic resin particles, crosslinked polyester particles, polyimide particles, melamine resin particles and the like. When crosslinked polystyrene resin particles or crosslinked silicone resin particles of the above polymer particles are contained, the effect of the present invention becomes more noticeable advantageously.

When the lubricant particles I and the lubricant particles II used in the present invention are the same or different in kind, a particle size distribution combining the particle size distribution of the lubricant particles I and the particle size distribution of the lubricant particles II has at least two peaks in particle size.

In the biaxially oriented laminate polyester film of the present invention, the outer surface of the polyester layer A, that is, a surface different from a polyester layer B-laminated surface preferably has a surface roughness of 2 to 15 nm (0.002 to 0.015 μm) in terms of central plane average surface roughness $^A WR_a$. The outer surface of the polyester layer B, that is, a surface different from a polyester layer A-laminated surface preferably has a surface roughness of 0.1 to 8 nm (0.0001 to 0.008 μm) in terms of central plane average surface roughness $^B WR_a$.

If the central plane average surface roughness $^A WR_a$ is less than 0.002 μm, the travelling property of the film will deteriorate, while if the central plane average surface roughness $^A WR_a$ is more than 0.015 μm, the scraping resistance of the film will deteriorate. In addition, even when a back coating is applied in the film processing step, the surface is liable to become very rough and the electromagnetic conversion characteristics of the resulting film is apt to be deteriorated by a so-called imprinting-to-backcoat phenomenon at the time of curing disadvantageously. If the above central plane average surface roughness $^B WR_a$ is less than 0.0001 μm, blocking between films is apt to be large, thereby deteriorating the take-up property of the film and the friction coefficient of a metal roll or the like in the film processing step tends to be high, thereby causing a travelling failure. On the other hand, if the $^B WR_a$ is more than 0.008 μm, the electromagnetic conversion characteristics of the resulting film is liable to greatly deteriorate disadvantageously.

The central plane average surface roughness $WR_a$ is measured under such measurement conditions of a magnification of 40× and a measurement area of 242×239 μm (0.058 mm$^2$) using a non-contact 3-D roughness measuring meter (TOPO-3D), supplied by WYKO Co. Ltd.

In the above biaxially oriented laminate polyester film, the polyester layer B does not need to contain inert particles but may contain inert particles. When the layer contains inert particles, it preferably contains inert particles having an average particle diameter of 0.005 to 1 μm, more preferably 0.05 to 0.6 μm in an amount of 0.001 to 0.3% by weight, more preferably 0.005 to 0.2% by weight, particularly preferably 0.005 to 0.1% by weight. Thereby, not only the friction coefficient is further improved but also the roll state of the film is improved. Preferred examples of the inert particles are the same as those of the lubricant particles contained in the polyester layer A. The lubricant particles contained in the polyester layers A and B may be the same or different in type and size.

The biaxially oriented laminate polyester film of the present invention can be produced by any of conventionally known methods and methods accumulated in the industry. For example, the film can be obtained by first producing an unstretched laminate film and then biaxially stretching the film. This unstretched laminate film can be produced by a conventionally known method for producing a laminate film. For example, there can be used a method for laminating together a polyester layer A and a polyester layer B forming an opposite surface thereof while polyesters are molten or cooled to solidify. More specifically, the laminate film can be produced by such a method as coextrusion, extrusion lamination or the like. The laminate film produced by the above method can be formed into a biaxially oriented film in accordance with a conventionally known method for producing a biaxially oriented film. For example, an unstretched laminate film is obtained by melt-coextruding a polyester at a temperature between a melting point (Tm: ° C.) and (Tm+70)° C. Then, the unstretched laminate film is stretched monoaxially (in the longitudinal or transverse direction) by 2.5 times or more, preferably 3 times or more, at a temperature between (Tg−10) and (Tg+70)° C. (Tg: higher glass transition temperature out of glass transition temperature of the polyester of the polyester layer A and glass transition temperature of the polyester of the polyester layer B) and then drawn in a direction perpendicular to the above direction by 2.5 times or more, preferably 3 times or more, at a temperature between Tg and (Tg+70)° C. The biaxially oriented film may be further stretched in a longitudinal and/or transverse direction(s) as required. The total stretch ratio is preferably 9 times or more, more preferably 12 to 35 times, particularly preferably 15 to 25 times in terms of area stretch ratio. Further, the biaxially oriented film can be heat-set at a temperature between (Tg+70) and (Tm−10)° C., for example, 180 and 250° C. The heat setting time is preferably 1 to 60 seconds.

The thus obtained biaxially oriented laminate polyester film preferably has Young's moduli of 400 kg/mm$^2$ in a longitudinal direction (MD) and 2,000 kg/mm$^2$ in a transverse direction (TD) perpendicular to the longitudinal direction. If this Young's modulus is less than 400 kg/mm$^2$, the contact pressure between a magnetic tape and a magnetic head will be insufficient, thereby causing deterioration in the electromagnetic conversion characteristics of the film disadvantageously If Young's modulus is more than 2,000 kg/mm$^2$, the film forming property of the film will deteriorate disadvantageously Particularly preferably, the Young's modulus in MD is 400 to 900 kg/mm$^2$ and the Young's modulus in TD is 550 to 1,500 kg/mm$^2$.

The biaxially oriented laminate polyester film of the present invention preferably has a total thickness of 2 to 10 μm, and the polyester layer A preferably has a thickness of 0.5 to 2 μm.

The biaxially oriented laminate polyester film of the present invention is preferably used as a base film for a magnetic recording medium, i.e., a magnetic tape, particularly preferably as a base film for a digital recording magnetic tape, owing to the above-described characteristics.

In other words, according to the present invention there is provided a magnetic recording medium which comprises a base layer formed of the biaxially oriented laminate polyester film of the present invention and a magnetic recording layer formed on the polyester layer A of the film.

Any known coating agent for forming the magnetic recording layer may be used.

Various physical values and characteristics in the present invention are measured and defined as follows.

(1) Average Particle Diameter (DP) of Particles

This is measured using the CP-50 model centrifugal particle size analyzer, supplied by Shimadzu Corporation. A particle diameter corresponding to 50 mass percent is read from a cumulative curve of the particles of each particle diameter and the amount thereof calculated based on the obtained centrifugal sedimentation curve, and taken as the average particle diameter ("Ryudo Sokutei Gijyutu (Particle Size Measuring Technology)" published by Nikkan Kogyo Press, pp. 242–247, 1975).

(2) Non-contact 3-D Central Plane Average Surface Roughness (WR$_a$)

This is measured under such conditions as a measuring magnification of 40 times and a measurement area of 242×239 μm (0.058 mm$^2$) using a non-contact 3-D roughness meter (TOPO-3D), supplied by WYKO Co., Ltd. WR$_a$ is calculated from the following equation based on surface analysis using software incorporated in the roughness meter and an output value from the meter is used.

$$WRa = \sum_{k=1}^{M}\sum_{j=1}^{N} |Z_{jk} - \overline{Z}|/(M \cdot N)$$

wherein $$\overline{Z} = \sum_{k=1}^{M}\sum_{j=1}^{N} Z_{jk}/(M \cdot N)$$

$Z_{jk}$ is a height on a 2-D roughness chart at a j-th position and a k-th position in each of directions when a measurement direction (242 μm) and a direction perpendicular to the measurement direction (239 μm) are divided into M divisions and N divisions, respectively.

(3) Blocking Index

A glass plate is placed under a laminate of two films with the underlying film fixed to the glass plate. In this case, the two films are laminated together in such a manner that the polyester layer A is in contact with the polyester layer B. A tensiometer for detecting tension is attached to one end of the upper film. A "prescale mat" supplied by Fuji Photo Film Co. Ltd. is set on this laminate in such a manner that an uneven surface of the mat is in contact with the film, and a metal plate and a weight are placed on the mat. At this time, the total weight of the prescale mat, the metal plate and the weight is adjusted to be 300 g and the area of the mat should be 100 cm$^2$. In this state, the glass plate is pulled out at a speed of 10 cm/min in a direction that tension is indicated by the tensiometer attached to the upper film and in parallel to the film plane. The tension force is detected by the tensiometer and a value obtained by dividing the detected value by 300 g is taken as a blocking index. By this method, a load is concentrated on a recess portion of the prescale mat so that the degree of blocking can be measured accurately.

(4) Travelling Friction Coefficient of Film

This is measured as follows, using an apparatus shown in FIG. 1. In FIG. 1, reference numeral 1 is an unwinding reel, 2 a tension controller, 3, 5, 6, 8 and 11 free rollers, 4 a tensiometer (inlet), 7 a fixing bar made of stainless steel SUS304 (outer diameter: 5 mmφ, surface roughness Ra: 20 nm), 10 a tensiometer (outlet), 12 a guide roller and 13 a take-up reel.

In an atmosphere at a temperature of 20° C. and a humidity of 60%, a non-magnetic surface of a magnetic tape is brought into contact with the fixing bar 7 at an angle θ of (152/180) π radian (152°) and moved (friction) at a speed of 200 cm/min. A tension (T2: g) at the outlet at the time when the tension controller 2 is adjusted to obtain a tension (T1) at the inlet of 35 g is detected by the outlet tensiometer after the film runs back and forth 50 times to calculate a travelling friction coefficient μk from the following equation.

$$\mu k = (2.303/\theta) \log (T_2/T_1) = 0.868 \log (T_2/35)$$

The magnetic tape is manufactured as follows.

The composition shown below is placed in a ball mill, kneaded for 16 hours and dispersed, and 5 parts by weight of an isocyanate compound (Desmodule L, supplied by Bayer AG) is added to the composition The resulting mixture is dispersed by a high-speed shearing and for 1 hour to obtain a magnetic coating.

<Composition of magnetic coating>

| | |
|---|---|
| needle-shaped Fe particles | 100 parts by weight |
| vinyl chloride-vinyl acetate copolymer (Eslec 7A of Sekisui Chemical Co. Ltd.) | 15 parts by weight |
| thermoplastic polyurethane resin | 5 parts by weight |
| chromium oxide | 5 parts by weight |
| carbon black | 5 parts by weight |
| lecitin | 2 parts by weight |
| aliphatic ester | 1 part by weight |
| toluene | 50 parts by weight |
| methyl ethyl ketone | 50 parts by weight |
| cyclohexanone | 50 parts by weight |

This magnetic coating is applied to one side of the biaxially oriented polyester film (layer A or B) to a thickness of 3 μm, oriented in a DC magnetic field of 2,500 Gauss, heated at 100° C., dried, supercalendered (linear pressure of 300 kg/cm, temperature of 80° C.) and wound up. This wound-up roll is left in an oven heated at 55° C. for 3 days and cut into a 1/20-inch wide piece to obtain a magnetic tape.

(5) Layer Thickness

Using a secondary ion mass spectrograph (SIMS), the concentration ratio (M$^+$/C$^+$) of an element(M$^+$) derived from the highest-concentration particle out of particles contained in a portion of up to a depth of 3,000 nm from the surface of the film to the carbon element (C$^+$) of the polyester is taken as a particle concentration, and analysis in a thickness direction up to a depth of 3,000 nm from the surface is carried out. The particle concentration is low in the surface layer but grows as the distance from the surface increases. The particle concentration begins to drop after it reaches the maximum value. Based on this concentration distribution curve, a depth at which the particle concentration of the surface layer becomes half the maximum value, this depth being deeper than the depth at which the particle concentration is the maximum value, is obtained and taken as a surface layer thickness.

The conditions are as follows.

1) measurement device secondary ion mass spectrograph (SIMS)
2) measurement conditions species of primary ion: $O_2^+$ acceleration voltage of primary ion: 12 KV current of primary ion: 200 nA raster area: 400 μm□ analyzed area: gate 30% degree of measurement vacuum: 6.0× $10^{-3}$ Torr E-GUN: 0.5 KV–3.0 A In the case where most of the particles contained in an area of up to a depth of 3,000 nm from the surface layer are organic polymer particles, it is difficult to measure them by SIMS. Therefore, the same depth profile as described above may be measured by XPS (X-ray photoelectron spectrograph), IR (infrared spectrograph) or the like while the film is etched from the surface to obtain the thickness of the surface layer.

(6) Particle Agglomeration Rate

The biaxially oriented polyester film is etched using the Plasma Reactor PR3, supplied by Yamato Kagaku K.K. under the following conditions.

| high frequency power (W): | 50 |
|---|---|
| oxygen flow rate (ml/min): | 30 |
| etching time (hr): | 0.5 |

SEM observation of the etched surface is made through the EMM3000 scanning electron microscope, supplied by Elionix Co. LTD. at a magnification of 10,000× to measure the agglomeration rate of lubricant particles.

(7) Electromagnetic Conversion Characteristics

Using a noise meter, supplied by Shibasoku K. K., the SN ratio of a video magnetic tape is measured to obtain the difference between S/N ratio of the video magnetic tape and that of the tape of Comparative Example 3 shown in Table 1 The VTR used is the EDV-6000 of Sony Corporation.

(8) Scraping Property (Scraping Property by Calendering)

A 150 mm wide film is caused to run 10,000 m by a 3-step type mini-supercalendering device (supplied by Yuri Roll K.K.) having an elastic roll made from a polyester resin at a heating roll temperature of 80° C., a linear pressure of 300 kg/cm, and a speed of 80 m/min. After this calendering is repeated 5 times, the scraping property of the film is evaluated from dirts on the elastic roll.

<evaluation>

◎: No dirt on the surface of the elastic roll is observed.

○: Though the glossiness of the surface of the elastic roll slightly lowers, the adhesion of scraped particles to the surface of the elastic roll is not observed.

X: The adhesion of scraped particles to the surface of the elastic roll is observed.

The following examples are given to further illustrate the present invention.

EXAMPLES 1 AND 2

Dimethyl-2,6-naphthalenedicarboxylate and ethylene glycol were mixed with manganese acetate as an ester exchange catalyst, antimony trioxide as a polymerization catalyst, phosphorus acid as a stabilizer and particles shown in Table 1 as a lubricant and polymerized by a commonly used method to obtain polyethylene-2,6-naphthalenedicarboxylate (PEN) for layers A and B having an intrinsic viscosity (in orthochlorophenol, at 35° C.) of 0.61.

The pellets of the polyethylene-2,6-naphthalenedicarboxylate were dried at 170° C. for 6 hours, supplied to the hoppers of two extruders, molten at a melting temperature of 280 to 300° C. and formed into a laminate consisting of layers A and B by a multi-manifold coextrusion die. The laminate was extruded onto a rotary cooling drum having a surface finishing degree of about 0.3S and a surface temperature of 60° C. to obtain an unstretched laminate film having a thickness of 120 μm.

The thus obtained unstretched laminate film was preheated at 120° C., further heated between low-speed and high-speed rolls from 15 mm above by an IR heater having a surface temperature of 900° C. to be drawn to 4.0 times, quenched, supplied to a stenter, and drawn to 5.0 times in a transverse direction at 145° C. The thus obtained biaxially oriented film was heat set with hot air heated at 210° C. for 4 seconds to obtain a biaxially oriented laminate polyester film having a thickness of 6.5 μm The films of Examples 1 and 2 had a Young's modulus in the longitudinal direction of 600 kg/mm² and a Young's modulus in the transverse direction of 900 kg/mm². Other characteristics of the films are shown in Table 2.

EXAMPLES 3 TO 6 AND COMPARATIVE EXAMPLES 1 TO 4

Polyethylene terephthalate (PET) for polyester layers A and B was obtained in the same manner as in Examples 1 and 2 except that the particles shown in Table 1 were used and dimethyl terephthalate was used in place of dimethyl-2,6-naphthalate.

After the pellets of the polyethylene terephthalate were dried at 170° C. for 3 hours, an unstretched laminate film was obtained in the same manner as in Examples 1 and 2 (except that the surface temperature of the rotary cooling drum was set to 20° C.).

The thus obtained unstretched laminate film was preheated at 78° C., further heated between low-speed and high-speed rolls from 15 mm above by an IR heater having a surface temperature of 850° C. to be drawn to 2.8 times, quenched, supplied to a stenter, and was drawn to 3.6 times in the transverse direction at 110° C. Subsequently the film was preheated at 110° C., heated between low-speed and high-speed rolls to be drawn to 2.0 times in the longitudinal direction, supplied to a stenter and was drawn to 1.5 times in a transverse direction at 90° C. The thus obtained biaxially oriented film was heat set with hot air heated at 220° C. for 4 seconds to obtain a biaxially oriented laminate polyester film having a thickness of 6.5 μm.

The thickness of each layer was adjusted by changing the discharged amounts of the two extruders. This film had a Young's modulus in the longitudinal direction of 600 kg/mm² and a Young's modulus in the transverse direction of 610 kg/mm². Other characteristics of the film are shown in Table 2.

TABLE 1

| | Polyester | Type of particle | Average particle diameter (μm) | Content (wt %) | Agglomeration rate (%) |
|---|---|---|---|---|---|
| | | Inert particles in layer A Particle I | | | |
| Ex. 1 | PEN | Crosslinked polystyrene particles | 0.6 | 0.05 | 10 |
| Ex. 2 | PEN | Crosslinked silicone resin particles | 0.6 | 0.01 | 5 |
| Ex. 3 | PET | Crosslinked polystyrene particles | 0.6 | 0.01 | 10 |
| Ex. 4 | PET | Crosslinked silicone resin particles | 0.5 | 0.05 | 15 |
| Ex. 5 | PET | Spherical silica particles | 0.8 | 0.01 | 10 |
| Ex. 6 | PET | Calcium carbonate particles | 0.6 | 0.05 | 7 |
| Comp. Ex. 1 | PET | Crosslinked silicone resin particles | 1.2 | 0.05 | 5 |
| Comp. Ex. 2 | PET | Crosslinked silicone resin particles | 0.5 | 5.00 | 5 |
| Comp. Ex. 3 | PET | Crosslinked silicone resin particles | 0.5 | 0.05 | 5 |
| Comp. Ex. 4 | PET | Crosslinked polystyrene particles | 0.5 | 0.05 | 25 |
| | | Particle II | | | |
| Ex. 1 | | Spherical silica particles | 0.3 | 0.20 | 10 |
| Ex. 2 | | Crosslinked silicone resin particles | 0.3 | 0.20 | 5 |
| Ex. 3 | | Spherical silica particles | 0.1 | 0.30 | 10 |
| Ex. 4 | | Spherical silica particles | 0.1 | 0.30 | 10 |
| Ex. 5 | | Spherical silica particles | 0.3 | 0.20 | 10 |
| Ex. 6 | | Spherical silica particles | 0.1 | 0.30 | 10 |
| Comp. Ex. 1 | | Spherical silica particles | 0.1 | 0.30 | 10 |
| Comp. Ex. 2 | | Spherical silica particles | 0.1 | 0.30 | 10 |
| Comp. Ex. 3 | | Spherical silica particles | 0.1 | 0.01 | 10 |
| Comp. Ex. 4 | | Aluminium oxide particles | 0.1 | 0.30 | 60 |
| | | Inert particles in layer B | | | |
| Ex. 1 | | Spherical silica particles | none | — | |
| Ex. 2 | | Spherical silica particles | 0.06 | 0.05 | |
| Ex. 3 | | Crosslinked silicone resin particles | 0.1 | 0.1 | |
| Ex. 4 | | Spherical silica particles | 0.1 | 0.05 | |
| Ex. 5 | | Spherical silica particles | 0.1 | 0.1 | |
| Ex. 6 | | Spherical silica particles | 0.1 | 0.1 | |
| Comp. Ex. 1 | | Spherical silica particles | 0.1 | 0.1 | |
| Comp. Ex. 2 | | Spherical silica particles | 0.1 | 0.1 | |
| Comp. Ex. 3 | | Spherical silica particles | 0.1 | 0.1 | |
| Comp. Ex. 4 | | Spherical silica particles | 0.1 | 0.1 | |

Ex.: Example
Comp. Ex.: Comparative Example

TABLE 2

|  | Thickness of layer A (μm) | Thickness of layer B (μm) | WR$_a$ Layer A side | WR$_a$ Layer B side | Magnetic layer-coated surface |
|---|---|---|---|---|---|
| Ex. 1 | 1.0 | 5.5 | 12.0 | 1.1 | Layer B |
| Ex. 2 | 1.0 | 5.5 | 8.0 | 1.5 | Layer B |
| Ex. 3 | 2.0 | 4.5 | 5.0 | 2.0 | Layer B |
| Ex. 4 | 1.0 | 5.5 | 6.0 | 2.0 | Layer B |
| Ex. 5 | 0.5 | 6.0 | 7.0 | 2.0 | Layer B |
| Ex. 6 | 1.0 | 5.5 | 6.0 | 2.0 | Layer B |
| Comp. Ex. 1 | 1.0 | 5.5 | 18.0 | 2.9 | Layer B |
| Comp. Ex. 2 | 1.0 | 5.5 | 25.0 | 3.5 | Layer B |
| Comp. Ex. 3 | 1.0 | 5.5 | 3.5 | 2.0 | Layer B |
| Comp. Ex. 4 | 1.0 | 5.5 | 6.0 | 2.5 | Layer B |

|  | Electromagnetic conversion characteristics | Blocking index | Travelling friction coefficient | Scraping resistance |
|---|---|---|---|---|
| Ex. 1 | +2.5 | 0.25 | 0.24 | ⊚ |
| Ex. 2 | +2 | 0.29 | 0.28 | ⊚ |
| Ex. 3 | ±0 | 0.32 | 0.35 | ⊚ |
| Ex. 4 | ±0 | 0.31 | 0.33 | ⊚ |
| Ex. 5 | ±0 | 0.30 | 0.30 | ⊚ |
| Ex. 6 | +0 | 0.29 | 0.34 | ○ |
| Comp. Ex. 1 | −0.9 | 0.24 | 0.24 | X |
| Comp. Ex. 2 | −1.5 | 0.23 | 0.24 | X |
| Comp. Ex. 3 | ±0 (standard) | 0.80 | 0.75 | X |
| Comp. Ex. 4 | −0.5 | 0.28 | 0.33 | X |

Ex.: Example
Comp. Ex.: Comparative Example

As is evident from Table 2, the biaxially oriented laminate polyester film of the present invention have excellent scraping resistance, traveling durability and film taking-up property while retaining excellent electromagnetic conversion characteristics.

According to the present invention, it is possible to provide a biaxially oriented laminate polyester film which satisfies requirements for surface flatness, scraping resistance and take-up property in the production process at the same time. This polyester film is useful as a base film for a magnetic recording medium, particularly for a magnetic tape such as a ½-inch video tape, 8 mm video tape, data cartridge tape or digital video tape.

What is claimed is:

1. A biaxially oriented laminated polyester film consisting of a polyester layer A containing lubricant particles I and II and a polyester layer B laminated on one side of the polyester layer A, wherein
   each of the lubricant particles I and II contains non-agglomerated particles in a proportion of 80 to 100%; the lubricant particles I are selected from the group consisting of silica, calcium carbonate and crosslinked polymer particles, have an average particle diameter of 0.3 to 1.0 μm and are present in an amount of 0.005% by weight or more but less than 0.1% by weight; the lubricant particles II are selected from the group consisting of silica and crosslinked polymer particles, have an average particle diameter which satisfies the following expression (1):

$$1 < d_I/d_{II} \leq 10 \tag{1}$$

wherein $d_I$ is an average particle diameter of the lubricant particles I and $d_{II}$ is an average particle diameter of the lubricant particles II, and are present in an amount of 0.1% by weight or more but less than 1.0% by weight.

2. The film of claim 1, wherein non-agglomerated particles account for 85 to 97% of the lubricant particles I.

3. The film of claim 1, wherein non-agglomerated particles account for 85 to 97% of the lubricant particles II.

4. The film of claim 1, wherein the lubricant particles I have an average particle diameter of 0.4 to 0.8 μm.

5. The film of claim 1, wherein the lubricant particles II have an average particle diameter that satisfies the following expression (2):

$$2 \leq d_I/d_{II} \leq 8 \tag{2}$$

wherein $d_I$ and $d_{II}$ are defined the same as in the above expression (1).

6. The film of claim 1, wherein the content of the lubricant particles I is 0.008 to 0.08% by weight.

7. The film of claim 1, wherein the content of the lubricant particles II is 0.2 to 0.5% by weight.

8. The film of claim 1, wherein the lubricant particles I and the lubricant particles II are different in kind.

9. The film of claim 1, wherein the lubricant particles I and the lubricant particles II are the same in kind and a particle size distribution combining the particle size distribution of the lubricant particles I and the particle size distribution of the lubricant particles II has at least two peaks in particle size.

10. The film of claim 1, wherein the outer surface of the polyester layer A has a central plane average surface roughness $^AWR_a$ of 2 to 15 nm.

11. The film of claim 1, wherein the outer surface of the polyester layer B has a central plane average surface roughness $^BWR_a$ of 0.1 to 8 nm.

12. The film of claim 1, wherein the polyester layer A has a thickness of 0.5 to 2 μm.

13. The film of claim 1 which has a thickness of 2 to 10 μm.

14. The film of claim 1 which has Young's moduli in two directions perpendicular to each other of 400 to 2,000 kg/mm².

15. A magnetic recording medium comprising a base layer of the film of claim 1 and a magnetic recording layer formed on the polyester layer A of said film.

16. A magnetic recording medium of claim 15 which is a magnetic tape for digital recording.

17. A magnetic recording medium comprising a base layer of the film of claim 1 and a magnetic recording layer formed on the polyester layer B of said film.

18. The magnetic recording medium of claim 17 which is a magnetic tape for a magnetic recording medium.

* * * * *